(12) United States Patent
Kamiya

(10) Patent No.: US 8,871,347 B2
(45) Date of Patent: Oct. 28, 2014

(54) MICROCAPSULE-TYPE LATENT CURING AGENT

(75) Inventor: Kazunobu Kamiya, Tochigi (JP)

(73) Assignee: Dexerials Corporation, Tokyo (JP)

( * ) Notice: Subject to any disclaimer, the term of this patent is extended or adjusted under 35 U.S.C. 154(b) by 122 days.

(21) Appl. No.: 12/672,806

(22) PCT Filed: Mar. 18, 2008

(86) PCT No.: PCT/JP2008/054927
§ 371 (c)(1),
(2), (4) Date: Feb. 9, 2010

(87) PCT Pub. No.: WO2009/028224
PCT Pub. Date: Mar. 5, 2009

(65) Prior Publication Data
US 2010/0324170 A1    Dec. 23, 2010

(30) Foreign Application Priority Data

Aug. 28, 2007 (JP) ................. 2007-220978

(51) Int. Cl.
*C08K 9/00* (2006.01)
*C12P 21/02* (2006.01)
*C08G 59/70* (2006.01)
*C08K 5/00* (2006.01)
*C08L 63/00* (2006.01)

(52) U.S. Cl.
CPC .............. *C08K 5/0091* (2013.01); *C08G 59/70* (2013.01); *C08L 63/00* (2013.01)
USPC ........ 428/402.2; 428/402; 428/404; 428/405; 428/403; 525/452; 525/475; 525/480; 525/523; 523/206

(58) Field of Classification Search
USPC ............. 428/402–402.24; 247/213.3–213.36; 264/4–4.7
See application file for complete search history.

(56) References Cited

U.S. PATENT DOCUMENTS 3,639,259 A * 2/1972 Scarpelli ...................... 435/68.1
5,914,193 A    6/1999 Ono et al.

(Continued)

FOREIGN PATENT DOCUMENTS

CN    1256288 A    6/2000
EP    1 009 025 A2    6/2000

(Continued)

OTHER PUBLICATIONS

International Search Report for International Application No. PCT/JP2008/054927, issued Jun. 17, 2008.

(Continued)

*Primary Examiner* — James J Seidleck
*Assistant Examiner* — S. Camilla Pourbohloul
(74) *Attorney, Agent, or Firm* — Oliff PLC

(57) ABSTRACT

An aluminum chelate-based latent curing agent having excellent latency and thermal response includes a latent curing agent in which an aluminum chelating agent is retained in a porous resin obtained by interfacial polymerization of a polyfunctional isocyanate compound, and an enzyme-treated gelatin film coating such latent curing agent. This microcapsule-type latent curing agent can be produced by dissolving an aluminum chelating agent and a polyfunctional isocyanate compound in a volatile organic solvent, charging the obtained solution into a gelatin-containing aqueous phase, carrying out interfacial polymerization by heating and stirring, and subjecting the gelatin to an enzyme treatment by adding an enzyme to the obtained polymerization reaction mixture.

10 Claims, 6 Drawing Sheets

(56) References Cited

U.S. PATENT DOCUMENTS

| | | | |
|---|---|---|---|
| 6,010,778 | A | 1/2000 | Kimura et al. |
| 6,027,816 | A | 2/2000 | Ono et al. |
| 6,248,454 | B1 | 6/2001 | Ikemura |
| 6,362,251 | B1 | 3/2002 | Alkemper et al. |
| 6,737,145 | B1 | 5/2004 | Watanabe et al. |
| 6,794,038 | B2 | 9/2004 | Matsushima |
| 6,822,341 | B1 | 11/2004 | Ahsan |
| 7,785,715 | B2 | 8/2010 | Tsumura et al. |
| 7,851,520 | B2 | 12/2010 | Kamiya |
| 8,039,522 | B2 | 10/2011 | Kamiya |
| 8,044,117 | B2 | 10/2011 | Matsushima et al. |
| 8,198,342 | B2 | 6/2012 | Kamiya |
| 8,349,397 | B2 | 1/2013 | Kojima et al. |
| 8,349,973 | B2 | 1/2013 | Kamiya |
| 2002/0076631 | A1 | 6/2002 | Itami et al. |
| 2002/0151627 | A1 | 10/2002 | Matsushima |
| 2002/0177654 | A1 | 11/2002 | Erdem et al. |
| 2004/0109943 | A1 | 6/2004 | Matsushima et al. |
| 2005/0107494 | A1 | 5/2005 | Matsushima et al. |
| 2007/0010636 | A1 | 1/2007 | Kamiya et al. |
| 2008/0319110 | A1 | 12/2008 | Kamiya et al. |
| 2009/0209669 | A1 | 8/2009 | Kamiya |
| 2009/0275708 | A1 | 11/2009 | Kamiya |
| 2010/0143604 | A1 | 6/2010 | Matsushima et al. |
| 2010/0249338 | A1 | 9/2010 | Kamiya |
| 2010/0323124 | A1 | 12/2010 | Vartabedian et al. |
| 2010/0324170 | A1 | 12/2010 | Kamiya |
| 2010/0331435 | A1 | 12/2010 | Kamiya |
| 2011/0196110 | A1 | 8/2011 | Kamiya |
| 2012/0119156 | A1 | 5/2012 | Kamiya |

FOREIGN PATENT DOCUMENTS

| | | | |
|---|---|---|---|
| JP | A-11-092549 | | 4/1999 |
| JP | A-11-092550 | | 4/1999 |
| JP | A-11-343332 | | 12/1999 |
| JP | A-2000-230039 | | 8/2000 |
| JP | A-2002-212537 | | 7/2002 |
| JP | A-2002-363255 | | 12/2002 |
| JP | A-2002-368047 | | 12/2002 |
| JP | A-2006-70051 | | 3/2006 |
| JP | A-2006-291053 | | 10/2006 |
| JP | A-2008-31325 | | 2/2008 |
| JP | A-2009-118207 | | 5/2009 |
| JP | B2-4381255 | | 12/2009 |
| WO | WO 03/068840 | A1 | 8/2003 |
| WO | WO 2006/075415 | A1 | 7/2006 |

OTHER PUBLICATIONS

International Preliminary Report on Patentability issued in International Application No. PCT/JP2008/054927 on Mar. 11, 2010 (with translation).
Jan. 2, 2014 Office Action issued in U.S. Appl. No. 12/213,439.
Mar. 11, 2013 Office Action issued in U.S. Appl. No. 12/213,439.
Aug. 22, 2012 Office Action issued in Japanese Patent Application No. 2009-118207; with English-language translation.
Jun. 7, 2011 Office Action issued in Korean Patent Application No. 10-2006-7004666; with English-language translation.
U.S. Appl. No. 12/213,439, entitled "Latent Curing Agent," Kamiya et al., filed Jun. 19, 2008.
Apr. 1, 2010 Office Action issued in U.S. Appl. No. 12/213,439.
Jun. 8, 2009 Office Action issued in U.S. Appl. No. 12/213,439.
Jan. 4, 2013 Notification of Reasons for Refusal issued in Japanese Application No. 2009-118207 (with English-language translation).
Apr. 15, 2014 Notification of Reason(s) for Refusal issued in Japanese Patent Application No. 2013-042937 (with English-language translation).

* cited by examiner

×3000

×25000

MICROCAPSULE-TYPE LATENT CURING AGENT

TECHNICAL FIELD

The present invention relates to a microcapsule-type latent curing agent which can initiate the curing of a thermosetting resin composition having an epoxy resin and the like as a main component at a relatively low temperature, a production method thereof, and a thermosetting resin composition which contains such a latent curing agent and which has good storage stability and low-temperature rapid curability.

BACKGROUND ART

Latent imidazole-based curing agents are widely used as a latent curing agent in thermosetting epoxy resin compositions. However, to initiate the curing reaction, such curing agents have to be heated under pressure to 180° C. or more. Accordingly, aluminum chelating agents which allow an epoxy resin to undergo cationic polymerization are known as latent curing agents which exhibit a low-temperature rapid curing activity (Patent Document 1). Furthermore, an aluminum chelate-based latent curing agent imparted with latency by retaining such an aluminum chelating agent in a porous resin obtained by emulsion polymerization of a polyfunctional isocyanate compound has been proposed (Patent Document 2).

[Patent Document 1] Japanese Patent Application Laid-Open No. 2002-363255
[Patent Document 2] Japanese Patent Application Laid-Open No. 2006-70051

DISCLOSURE OF THE INVENTION

Problems to be Solved by the Invention

However, for the aluminum chelate-based latent curing agent described in Example 1 of Patent Document 2, according to so-called differential thermal analysis (DSC measurement), the exothermic onset temperature is 75° C. and the exothermic peak temperature is 106° C., meaning that the temperature difference between the exothermic onset temperature and the exothermic peak temperature is approximately 30° C. Thus, in order to further improve latency as a latent curing agent, that temperature difference has to be further narrowed. In addition, although the profile near the exothermic peak in the DSC curve is sharp, to further improve the thermal response as a latent curing agent, that profile has to be made even sharper.

The present invention resolves the above-described problems in the conventional art. It is an object of the present invention to provide an aluminum chelate-based latent curing agent having excellent latency and thermal response, a production method thereof, and a thermosetting resin composition which contains such a latent curing agent and which has good storage stability and low-temperature rapid curability.

Means for Solving the Problems

As a result of a variety of research into latent curing agents in which an aluminum chelating agent is retained in a porous resin obtained by interfacial polymerization of a polyfunctional isocyanate compound to improve the latency and the thermal response of the latent curing agent, the present inventor discovered that the exothermic onset temperature can be shifted to the high temperature side without shifting the exothermic peak temperature, yet the temperature width from the initial rise from the base of the exothermic peak on the DSC curve until the return to the base can be made smaller and the peak intensity can be increased, by subjecting a gelatin reaction film obtained by reacting a polyfunctional isocyanate compound in gelatin to an enzyme treatment, thereby completing the present invention.

Specifically, the present invention provides a microcapsule-type latent curing agent including a latent curing agent in which an aluminum chelating agent is retained in a porous resin obtained by interfacial polymerization of a polyfunctional isocyanate compound, and an enzyme-treated gelatin film coating the latent curing agent.

Furthermore, the present invention is a method for producing the above-described microcapsule-type latent curing agent, the method characterized by dissolving an aluminum chelating agent and a polyfunctional isocyanate compound in a volatile organic solvent, charging the obtained solution into a gelatin-containing aqueous phase, carrying out interfacial polymerization by heating and stirring, and subjecting the gelatin to an enzyme treatment by adding an enzyme to the obtained polymerization reaction mixture.

Furthermore, the present invention provides a thermosetting resin composition characterized by including the above-described microcapsule-type latent curing agent, a silane coupling agent, and a thermosetting resin.

Effects of the Invention

Since the microcapsule-type latent curing agent of the present invention has an aluminum chelating agent retained in a porous resin obtained by interfacial polymerization of a polyfunctional isocyanate compound, it can cure a thermosetting epoxy resin at a relatively low temperature and in a short time. Furthermore, because such latent curing agent is formed as a microcapsule with an enzyme-treated gelatin film, thermal response is improved. According to the method for producing the latent curing agent of the present invention, an aluminum chelating agent and a polyfunctional isocyanate compound are dissolved in a volatile organic solvent, the obtained solution is charged into a dispersant-containing aqueous phase, and interfacial polymerization is carried out by heating and stirring. Accordingly, the curing conditions of the latent curing agent can be controlled relatively easily. In addition, since the thermosetting resin composition of the present invention includes the above-described microcapsule-type latent curing agent of the present invention, a silane coupling agent, and a thermosetting resin, such a thermosetting resin composition exhibits low-temperature rapid curability.

Figure 1A:
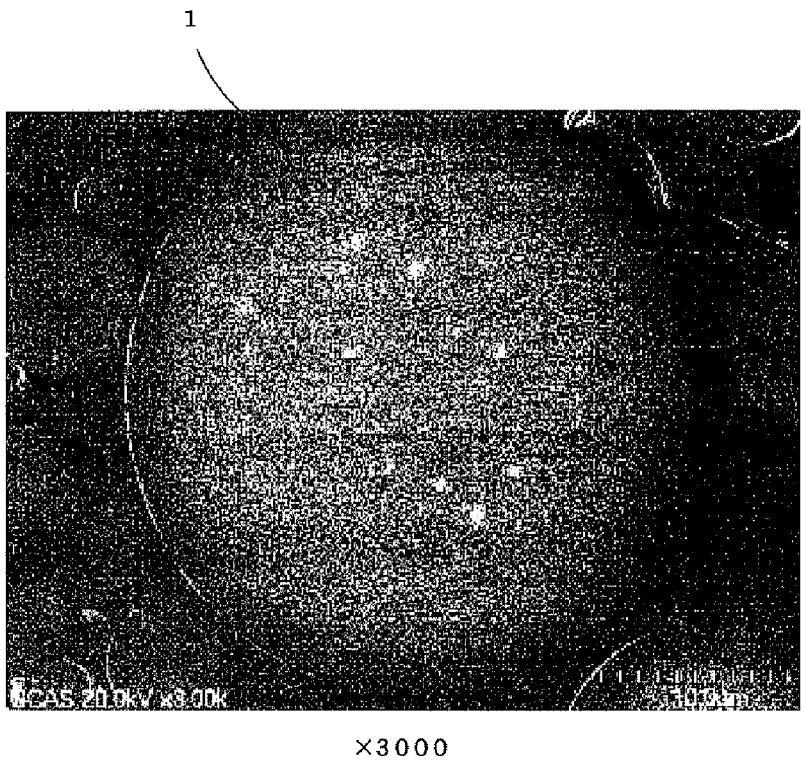
FIG. 1A is an electron micrograph of latent curing agent particles which are not coated with a gelatin film.

DESCRIPTION OF REFERENCE NUMERAL 1 latent curing agent
2 porous resin matrix
3 pores
10 microcapsule-type latent curing agent

BEST MODE FOR CARRYING OUT THE INVENTION

The microcapsule-type latent curing agent of the present invention is composed of a latent curing agent in which an aluminum chelating agent is retained in a porous resin obtained by interfacial polymerization of a polyfunctional isocyanate compound, and an enzyme-treated gelatin film coating the latent curing agent. Since an aluminum chelating agent which can realize low-temperature rapid curability is used, this microcapsule-type latent curing agent can impart good low-temperature rapid curability to a thermosetting resin composition which is blended with such a latent curing agent. Furthermore, since an aluminum chelating agent is retained in a porous resin obtained by interfacial polymerization, the storage stability of the thermosetting resin composition can be dramatically improved even if the thermosetting resin composition is blended with such a latent curing agent (even in a one-component liquid state). In addition, since the latent curing agent is coated with an enzyme-treated gelatin film, the thermal response can be improved.

Figure 1B:
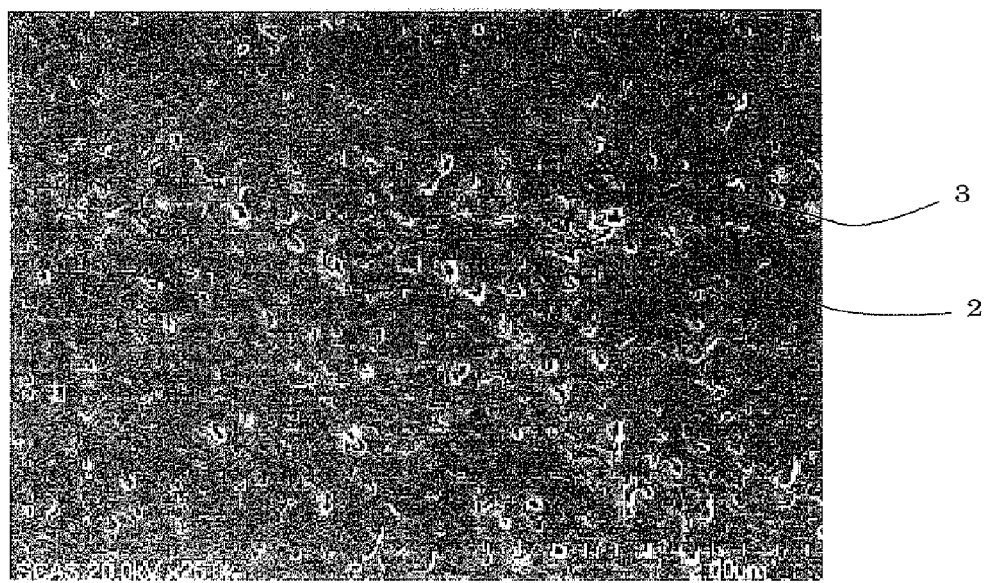
FIG. 1B is an enlarged electron micrograph of the center vicinity of the latent curing agent particles of FIG. 1A.
Figure 1C:
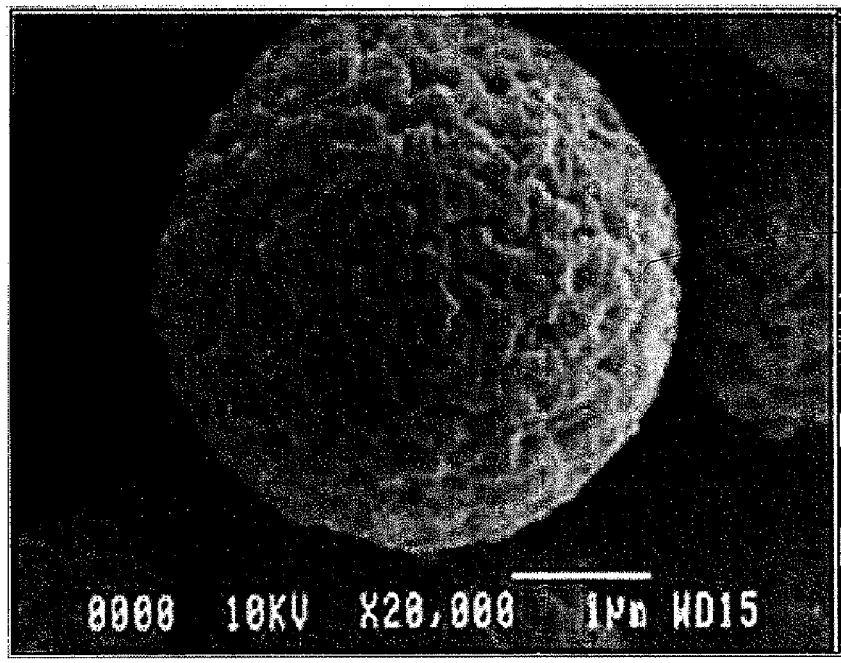
FIG. 1C is an electron micrograph of the microcapsule-type latent curing agent of the present invention.

As shown in the electron micrograph of the latent curing agent 1 (FIG. 1A) and an enlarged electron-micrograph of the center vicinity thereof (FIG. 1B), rather than having a simple microcapsule structure in which an aluminum chelating agent core is coated with a porous resin shell, the microcapsule-type latent curing agent of the present invention has a structure in which the aluminum chelating agent is retained in numerous fine pores 3 present in a porous resin matrix 2, and an enzyme-treated gelatin film is further coated around the periphery thereof (10 in FIG. 1C: SEM photograph at a magnification of 20000). In addition, surface irregularities may be formed on the gelatin film by the enzyme treatment.

Here, the microcapsule-type latent curing agent 10 of the present invention is produced by interfacial polymerization, and thus has a roughly spherical shape. From the perspectives of curability and dispersibility, the particle size is preferably in the range of from 0.5 to 100 μm. Furthermore, from the perspectives of curability and latency, the pores 3 preferably have a size of from 5 to 150 nm.

Furthermore, the enzyme-treated gelatin film is formed by treating a gelatin reaction film once formed on the periphery of the latent curing agent 1 according to a common method with an enzyme. If the thickness of this film is too thin, latency tends to deteriorate, while if the thickness is too thick, thermal response tends to deteriorate. Thus the thickness of the film is preferably in the range of from 1 to 1000 nm, and more preferably in the range of from 10 to 500 nm.

Although the enzyme treatment will be described in more detail below, an example of such operation is to directly charge an enzyme such as a protease into a polymerization reaction solution after the interfacial polymerization reaction finished, and then stir the resultant mixture while heating to an active temperature region of the enzyme. After the enzyme treatment, purification may also be carried out according to a common method.

Figure 1D:
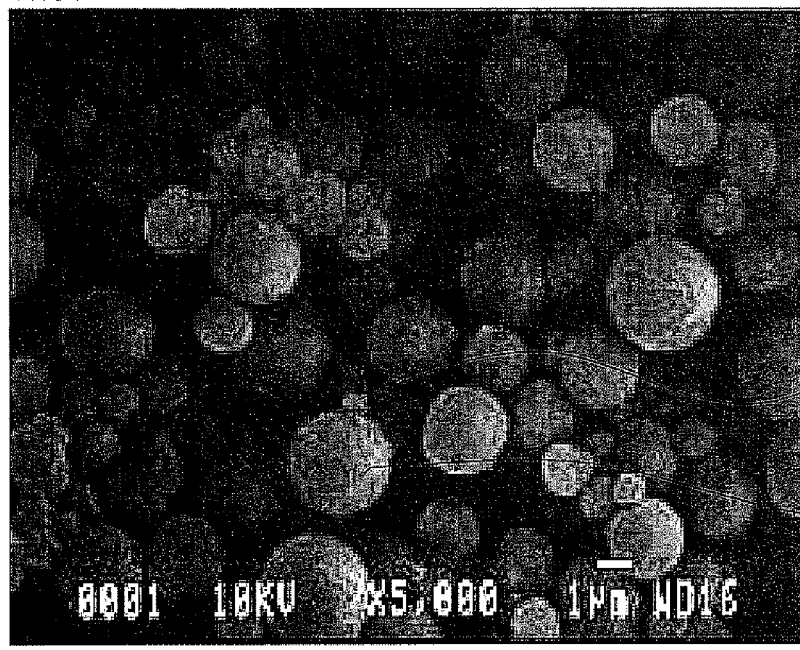
FIG. 1D is an electron micrograph of a microcapsule-type latent curing agent coated with a non-enzyme-treated gelatin film.
Figure 1E:
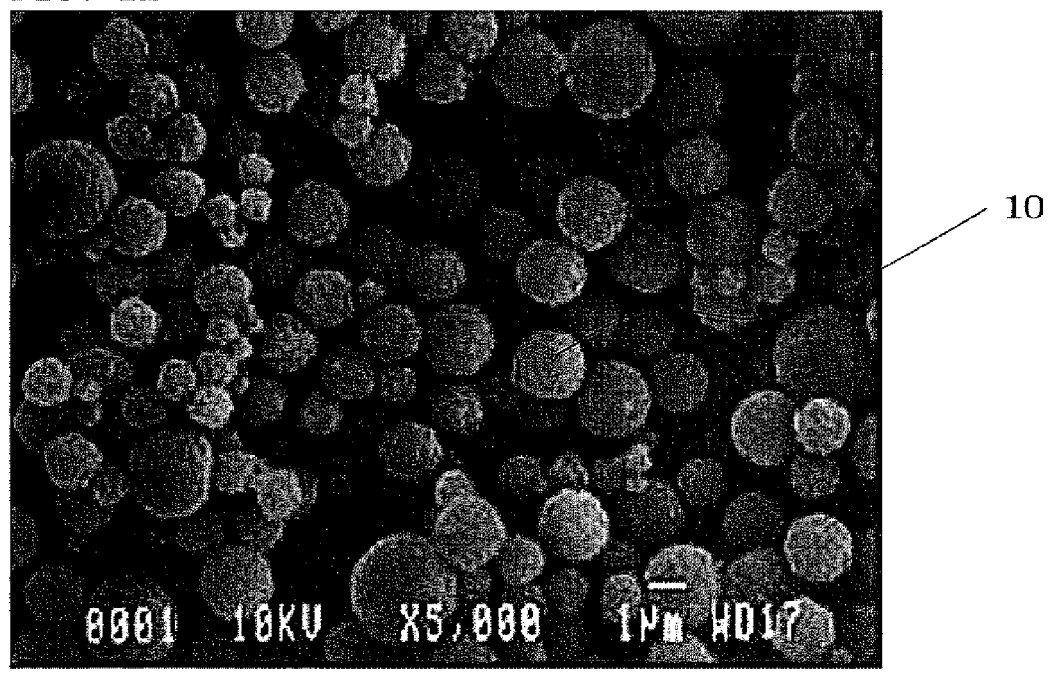
FIG. 1E is an electron micrograph of a microcapsule-type latent curing agent coated with an enzyme-treated gelatin film.

Furthermore, if the gelatin film is not subjected to an enzyme treatment, although purification may be carried out by adding water to the polymerization mixture after the interfacial polymerization, filtering, and then washing with water, as shown in FIG. 1D, foreign matter F tends to adhere to the periphery of the latent curing agent 10'. In contrast, when the gelatin film is subjected to an enzyme treatment, as shown in FIG. 1E, adherence of foreign matter to the periphery of the microcapsule-type latent curing agent 10 is not observed.

Furthermore, in the microcapsule-type latent curing agent 10 of the present invention obtained by interfacial polymerization, some of the primary particles may agglomerate into secondary particles. In such a case, it is common to crack with a jet mill or the like. However, the enzyme-treated gelatin film can be destroyed by the cracking treatment. As a result, the exothermic peak temperature may shift to the low-temperature side, whereby latency as well as exothermic peak intensity tends to deteriorate. Accordingly, in the present invention, the change in exothermic peak temperature and intensity can be suppressed by making a polyvinyl alcohol co-exist during the enzyme treatment, and incorporating the polyvinyl alcohol into the enzyme-treated gelatin film. This can be considered as being due to the polyvinyl alcohol improving the strength of the enzyme-treated gelatin film.

As the polyvinyl alcohol, a polyvinyl alcohol obtained by saponifying and then neutralizing 80 mol % or more of the ester groups of the polyvinyl acetate may be used.

The content of such a polyvinyl alcohol in the enzyme-treated gelatin membrane is preferably in the range of from 0.1 to 30 mass %, and more preferably in the range of from 1 to 10 mass %.

Furthermore, if the degree of crosslinking of the used porous resin is too small, the latency of the microcapsule-type latent curing agent 10 tends to deteriorate, while if the degree of crosslinking is too large, the thermal response tends to deteriorate. Thus, it is preferred to use a porous resin with a degree of crosslinking which is adjusted according to the intended use. Here, the degree of crosslinking of the porous resin can be measured by a fine compression test.

From the perspective of curing stability, it is preferred that the microcapsule-type latent curing agent 10 of the present invention essentially does not contain the organic solvent used during the interfacial polymerization. Specifically, it is preferred that the organic solvent is contained in the amount of not greater than 1 ppm.

Furthermore, with regard to the contents of the porous resin and the aluminum chelating agent in the microcapsule-type latent curing agent 10 of the present invention, if the content of the aluminum chelating agent is too low, thermal response deteriorates, while if the content is too high, latency deteriorates. Therefore, based on 100 parts by mass of the porous resin, the aluminum chelating agent content is preferably in the range of from 10 to 200 parts by mass, and more preferably in the range of from 10 to 150 parts by mass.

In the microcapsule-type latent curing agent according to the present invention, examples of the aluminum chelating agent include complex compounds represented by the formula (I), in which three β-ketoenolate anions are coordinated to aluminum.

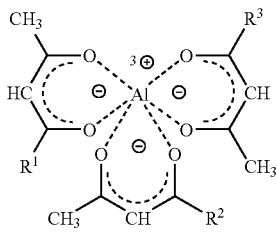

(1)

Here, $R^1$, $R^2$, and $R^3$ are each independently an alkyl group or an alkoxyl group. Examples of the alkyl group include a methyl group, an ethyl group and the like. Examples of the alkoxyl group include a methoxy group, an ethoxy group, an oleyloxy group and the like.

Specific examples of the aluminum chelating agent represented by the formula (1) include aluminum tris(acetylacetonate), aluminum tris(ethylacetoacetate), aluminum monoacetylacetonate bis(ethylacetoacetate), aluminum monoacetylacetonate bisoleylacetoacetate, ethylacetoacetate aluminum diisopropylate, alkylacetoacetate aluminum diisopropylate, and the like.

The polyfunctional isocyanate compound is a compound which preferably has two or more, and more preferably three isocyanate groups in one molecule. More preferred examples of such trifunctional isocyanate compounds include trimethylolpropane (TMP) adducts of the formula (2) obtained by reacting 1 mol of TMP with 3 mols of a diisocyanate compound; isocyanurates of the formula (3) obtained by self-condensation of 3 mols of a diisocyanate compound; and biurets of the formula (4) obtained by condensation of diisocyanate urea obtained from 2 mols of 3 mols of a diisocyanate compound with the remaining 1 mol of the diisocyanate compound.

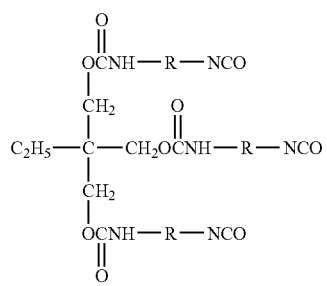

(2)

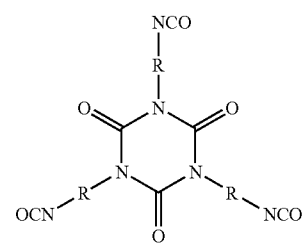

(3)

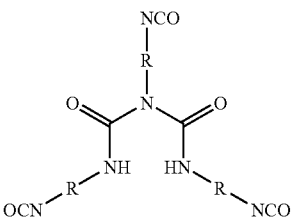

(4)

In the above formulas (2) to (4), the substituent R is the moiety of a diisocyanate compound from which an isocyanate group was removed. Specific examples of the diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, methylenediphenyl-4,4'-diisocyanate, and the like.

In the porous resin obtained by interfacial polymerization of such a polyfunctional isocyanate compound, some of the isocyanate groups are hydrolyzed during the interfacial polymerization into amino groups. These amino groups react with the isocyanate groups to form a urea bond, and are thus polymerized to form a porous polyurea. Although the reason why this occurs is not clearly known, when a latent curing agent formed from such a porous resin and such an aluminum chelating agent retained in the pores of the resin is heated for curing, the retained aluminum chelating agent comes into contact with the silane coupling agent and the thermosetting resin that coexist with the latent curing agent, whereby the curing reaction proceeds.

In the structure of the microcapsule-type latent curing agent of the present invention, the aluminum chelating agent is thought to be present on the interface of the porous resin coated with the enzyme-treated gelatin film. Although some of the aluminum chelating agent is inactivated by the water present in the system during the interfacial polymerization, the aluminum chelating agent retained within the porous resin and the aluminum chelating agent that was coated with the gelatin before being deactivated by water, remain active. As a result of this, it is thought that the obtained microcapsule-type latent curing agent can acquire latency.

The microcapsule-type latent curing agent of the present invention can be produced by dissolving an aluminum chelating agent and a polyfunctional isocyanate compound in a volatile organic solvent, charging the obtained solution into an aqueous phase containing gelatin and optionally a polyvinyl alcohol and a surfactant, carrying out interfacial polymerization by heating and stirring, and subjecting the gelatin to an enzyme treatment by adding an enzyme to the obtained polymerization reaction mixture.

In this production method, first, the aluminum chelating agent and the polyfunctional isocyanate compound are dissolved in a volatile organic solvent to prepare a solution to serve as the oil phase in the interfacial polymerization. The volatile organic solvent is used for the following reason. If a high boiling point solvent with a boiling point of more than 300° C. such as that normally used in interfacial polymerization is used, the organic solvent does not evaporate during the interfacial polymerization. As a result, the chance of the isocyanate coming into contact with water does not increase, so that the level of progress of the interfacial polymerization is not sufficient. This makes it difficult to obtain a polymer with good shape-retaining properties even by the interfacial polymerization. Moreover, even if such a polymer is obtained, the high-boiling-point solvent remaining in the polymer adversely affects the physical properties of the cured product of the thermosetting resin composition when the polymer is blended in thermosetting resin composition. For this reason, a volatile organic solvent is used as the organic solvent used in the preparation of the oil phase in the present production method.

Preferably, the volatile organic solvent is a good solvent for the aluminum chelating agent and the polyfunctional isocyanate compound (the solubility of each of them is preferably 0.1 g/ml (organic solvent) or higher), is essentially insoluble in water (solubility in water of 0.5 g/ml (organic solvent) or lower), and has a boiling point of 100° C. or below under atmospheric pressure. Specific examples of such a volatile organic solvent include alcohols, acetates, ketones and the like. Of these solvents, ethyl acetate is preferred because of its high polarity, low boiling point, and poor solubility in water.

If the used amount of volatile organic solvent is too low, latency deteriorates, while if the used amount is too high, thermal response deteriorates. Thus, the used amount is preferably in the range of from 100 to 500 parts by mass with respect to 100 parts by mass of the sum of the aluminum chelating agent and the polyfunctional isocyanate compound.

The viscosity of the solution to serve as the oil phase can be reduced, for example, by using a relatively large amount of the volatile organic solvent within the range of the volatile organic solvent used amount. Lowering the viscosity improves the stirring efficiency, which enables the oil phase droplets in the reaction system to be formed more finely and uniformly. As a result, the particle size of the resultant latent curing agent can be controlled to a size of from submicrons to several microns, thereby allowing a monodispersed particle size distribution. The viscosity of the solution to serve as the oil phase is preferably set within the range of from 1 to 2.5 mPa·S.

When emulsifying and dispersing the polyfunctional isocyanate compound, the hydroxide groups of the surfactant and the dispersant can react with the polyfunctional isocyanate compound, which can cause by-products to adhere around the latent curing agent particles or cause the shape of the particles to be deformed. Measures to prevent these phenomena include facilitating the reaction between the polyfunctional isocyanate compound and water and suppressing the reaction between the polyfunctional isocyanate compound and the hydroxide groups of the surfactant and the dispersant.

To facilitate the reaction between the polyfunctional, isocyanate compound and water, the blended amount of the aluminum chelating agent is preferably one-half or less, and more preferably one-third or less, the weight of the polyfunctional isocyanate compound. In this manner, the chance of the polyfunctional isocyanate compound coming into contact with water increases, so that the reaction occurs more easily.

In addition, an example of a way to suppress the reaction between the polyfunctional isocyanate compound and the hydroxide groups of the surfactant and the dispersant is to increase the blended amount of the aluminum chelating agent in the oil phase. Specifically, the blended amount of the aluminum chelating agent is preferably equal to or higher, and more preferably 1.0 to 2.0 times the weight of the polyfunctional isocyanate compound. In this manner, the isocyanate concentration at the oil phase droplet surface is decreased. Furthermore, the chance of the polyfunctional isocyanate compound reacting with the hydroxide groups of the surfactant and the dispersant can be decreased, since the reaction (interfacial polymerization) rate of the polyfunctional isocyanate compound with the amine formed by hydrolysis is greater than that with the hydroxyl groups.

When dissolving the aluminum chelating agent and the polyfunctional isocyanate compound in the volatile organic solvent, this may be carried out by simply stirring and mixing under atmospheric pressure at room temperature, or optionally by heating.

Next, the gelatin-containing aqueous phase is prepared. From the perspective of enabling the particle size to be controlled to a single-digit micrometer order, it is preferred to use a gelatin which has undergone an acid treatment as the used gelatin. Furthermore, from the perspective of gel network formation, it is preferred to use a gelatin having a relatively low jelly strength. Specifically, it is preferred to use a gelatin which exhibits a jelly strength according to JIS K6503-2001 of 10 to 200. In addition, from the perspective of emulsion dispersion stability, it is preferred to use a gelatin having a weight average molecular weight of 1000 to 110000.

Distilled water and deionized water can be preferably used as the water. If the content of gelatin with respect to water is too low, emulsification is destabilized, while if the content is too high, the emulsion dispersibility deteriorates. Thus, with respect to 100 parts by mass of water, the gelatin content is preferably in the range of from 0.1 to 50 parts by mass, and more preferably in the range of from 0.1 to 10 parts by mass. Furthermore, if the gelatin content with respect to the used polyfunctional isocyanate compound is too low, reactivity is low, while if the gelatin content is too high, reactivity is high. Thus, with respect to 100 parts by mass of polyfunctional isocyanate compound, the gelatin content is preferably in the range of from 1 to 100 parts by mass, and more preferably in the range of from 10 to 50 parts by mass.

For the purpose of emulsion stability, this aqueous phase preferably contains a surfactant as necessary. From the perspectives of isocyanate reactivity and being free from a halogen, an alkyl benzene sulfonate may be preferably used as the surfactant. Furthermore, if the surfactant content is too low, the emulsion stability deteriorates, while if the surfactant content is too high, fine particles and bubbles are formed. Thus, with respect to 100 parts by mass of water, such as distilled water, the surfactant content is preferably in the range of from 0.001 to 10 parts by mass, and more preferably in the range of from 0.001 to 0.1 parts by mass.

Even if an isolated microcapsule-type latent curing agent of the present invention is cracked by a jet mill or the like, it is preferred to use this aqueous phase together with a polyvinyl alcohol to ensure that exothermic peak temperature is not changed and the exothermic peak intensity is not reduced. As the polyvinyl alcohol, it is preferred to use a polyvinyl alcohol obtained by saponifying and then neutralizing 80 mol % or more of the ester groups of the polyvinyl acetate.

If the content of the polyvinyl alcohol in the aqueous phase is too low, the particle coating effects deteriorate, while if the content is too high, the reactivity between the gelatin and the polyvinyl alcohol deteriorates. Thus, with respect to 100 parts by mass of water, such as distilled water, the content of the polyvinyl alcohol in the aqueous phase is preferably in the range of from 0.001 to 10 parts by mass, and more preferably in the range of from 0.001 to 1 part by mass.

Next, in the present production method, the oil phase solution obtained by dissolving the aluminum chelating agent and the polyfunctional isocyanate compound in the volatile organic solvent is charged into the gelatin-containing aqueous phase, and the resultant mixture is heated and stirred to cause interfacial polymerization. As a result, a microcapsule-type latent curing agent coated with a non-enzyme-treated gelatin film is obtained.

If the blended amount of the oil phase solution with respect to the aqueous phase is too low, a polydispersion state is formed, while if the blended amount is too high, aggregates are formed as a result of the particles becoming finer. Thus, the blended amount is preferably in the range of from 5 to 50 parts by mass with respect to 100 parts by mass of the aqueous phase.

Examples of the emulsification conditions for the interfacial polymerization include stirring carried out so that the size of the oil phase preferably becomes 0.5 to 100 μm (a stirring speed of 8000 rpm or more using a stirring apparatus homogenizer), and heating and stirring carried out usually under atmospheric pressure at a temperature of from 30 to 80° C. for a stirring time of from 2 to 12 hours.

After interfacial polymerization has finished, the temperature of the polymerization reaction solution containing a microcapsule-type latent curing agent coated with a non-enzyme-treated gelatin film is adjusted to an enzyme active temperature region (for example, 30 to 60° C.) and an enzyme treatment of the gelatin film is carried out by charging an enzyme into the solution and stirring.

A protease can be preferably used as the enzyme. Specific examples thereof include Protease N "Amano G," Newlase F3G, Bromelain F (Amano Enzyme Inc.). If the used amount of the enzyme is too low, the gelatin is not sufficiently degraded, while if the used amount is too high, the enzyme turns into residual foreign matter. Thus, the used amount of the enzyme is preferably in the range of from 0.1 to 30 parts by mass, and more preferably in the range of from 1 to 10 parts by mass, with respect to 100 parts by mass of the used gelatin.

After the acid treatment, the microcapsule-type latent curing agent of the present invention coated with an enzyme-treated gelatin film is filtered from the reaction solution, washed, and dried. Furthermore, the present microcapsule-type latent curing agent may optionally be cracked by a jet mill and the like.

The above-described production method of the present invention allows the curing properties of the microcapsule-type latent curing agent to be controlled by changing the types and the amounts of the polyfunctional isocyanate compound, the aluminum chelating agent, the gelatin, and the polyvinyl alcohol, and the conditions for the interfacial polymerization and the enzyme treatment. For example, by lowering the polymerization temperature, the curing temperature can be decreased. Conversely, by increasing the polymerization temperature, the curing temperature can be increased.

The microcapsule-type latent curing agent of the present invention can be used for the same applications as conventional imidazole-based latent curing agents, and can preferably provide a low-temperature rapid curing thermosetting resin composition by using with a silane coupling agent and a thermosetting resin.

If the microcapsule-type latent curing agent content in the thermosetting resin composition is too low, the composition does not sufficiently cure, while if the content is too high, the resin properties (for example, flexibility) of the cured product of the composition deteriorate. Thus, with respect to 100 parts by mass of the thermosetting resin, the content is preferably in the range of from 1 to 70 parts by mass, and more preferably in the range of from 1 to 50 parts by mass.

The silane coupling agent has a function of initiating cationic polymerization of a thermosetting resin (for example, a thermosetting epoxy resin) in conjunction with the aluminum chelating agent, as described in the paragraphs 0007 to 0010 of Japanese Patent Application Laid-Open No. 2002-212537. Such a silane coupling agent has 1 to 3 lower alkoxy groups in the molecule, and may have a group which is reactive to the functional group of the thermosetting resin in the molecule. Examples of such a group include a vinyl group, a styryl group, an acryloyloxy group, a methacryloyloxy group, an epoxy group, an amino group, a mercapto group and the like. Furthermore, since the microcapsule-type latent curing agent according to the present invention is a cationic curing agent, a coupling agent having an amino group or a mercapto group can be used in cases where the amino group or mercapto group essentially does not capture the generated cation species.

Specific examples of such a silane coupling agent include: vinyltris(β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane and the like.

If the silane coupling agent content in the thermosetting resin composition is too low, the composition has low curing properties, while if the content is too high, the resin properties (for example, storage stability) of the cured product of the composition deteriorate. Thus, with respect to 100 parts by mass of the latent curing agent, the content is in the range of from 50 to 1500 parts by mass, and preferably in the range of from 300 to 1200 parts by mass.

Examples of thermosetting resins which can be used include thermosetting epoxy resins, thermosetting urea resins, thermosetting melamine resins, and thermosetting phenol resins. Among these, if adhesive strength after curing is considered as a beneficial point, thermosetting epoxy resins can be preferably used.

Such thermosetting epoxy resins may be in a liquid or a solid state, and preferably have an epoxy equivalent of usually about 100 to 4000, and two or more epoxy groups in the molecule. Examples which can be preferably used include bisphenol A-type epoxy compounds, phenol novolac-type epoxy compounds, cresol novolac-type epoxy compounds, ester-type epoxy compounds, alicyclic epoxy compounds and the like. In addition, monomers and oligomers are included in these compounds.

The thermosetting resin composition of the present invention may optionally include a filling agent such as silica and mica, a pigment, an antistatic agent and the like.

The thermosetting resin composition of the present invention can be produced by uniformly mixing and stirring by a common method the microcapsule-type latent curing agent, the silane coupling agent, the thermosetting resin, and the other optionally-added additives.

The thus-obtained thermosetting resin composition of the present invention has a curing agent which is latent, so that despite being a one-component type, the composition has excellent storage stability. Furthermore, the latent curing agent works together with the silane coupling agent so that the thermosetting resin can undergo cationic polymerization by low-temperature, rapid curing.

EXAMPLES

The present invention will now be described in more detail by the following examples.

Examples 1a to 1g 840 parts by mass of distilled water, 0.05 parts by mass of a surfactant (Newrex R-T, NOF Corporation), and 8 parts by mass of the gelatin in Table 1 were charged into a three-liter interfacial polymerization vessel equipped with a thermometer, and the resultant solution was uniformly mixed. This mixed solution was further charged with an oil phase solution in which 36 parts by mass of a 24% isopropanol solution of aluminum monoacetylacetonate bis(ethylacetoacetate) (Alumichelate D, Kawaken Fine Chemicals Co., Ltd.) and 25 parts by mass of a methylenediphenyl-4,4'-diisocyanate (3 mol) in trimethylolpropane (1 mol) adduct (D-109, Mitsui Takeda Chemicals Inc.) were dissolved in 135 parts by mass of ethyl acetate. The resultant solution was emulsified and mixed by a homogenizer (10000 rpm for 10 min, homogenizer T-50, IKA). Then, the mixture was allowed to undergo interfacial polymerization for 3 hours at 60° C.

After the reaction was finished, the temperature of the polymerization reaction solution was adjusted to 40° C. The solution was then charged with 0.08 parts by mass of an enzyme (Protease N "Amano G", Amano Enzyme Inc.), and the resultant solution was stirred for 6 hours at 40° C. The resultant interfacial polymerization particles were filtered, washed, and then dried to obtain a spherical microcapsule-type latent curing agent coated with an enzyme-treated gelatin film.

The used gelatin viscosity (JIS K6503-2001) and jelly strength (JIS K6503-2001), and the weight average molecular weight catalog values are shown in Table 1. Furthermore, the particle size controllability for the obtained microcapsule-type latent curing agent was evaluated according to the following criteria by measuring the particle size distribution (SD-2000, Symex).

<Particle Size (Value in Terms of Volume) Controllability Evaluation Criteria>

A: Maximum particle size is less than 5 μm, and particle size distribution is a normal distribution.
B: Maximum particle size is less than 10 μm, and particle size distribution is a normal distribution.
C: Maximum particle size is less than 30 μm.
D: Measurement with the particle size distribution meter is impossible due to agglomeration among the particles, but maximum particle size is less than 30 μm.

TABLE 1

| Example Gelatin | Pretreatment | Viscosity (mPa·S)[10] | Jelly strength (g)[11] | Weight average molecular weight | Particle size controllability |
|---|---|---|---|---|---|
| 1a SRC[1] | Alkali treatment[8] | 4.0-5.0 | 250 | 205,000 | C |
| 1b R fine powder[2] | Alkali treatment[8] | 2.5-3.5 | 100 | 136,000 | C |
| 1c APH-250[3] | Acid treatment[9] | 3.0-4.0 | 250 | 123,000 | D |
| 1d APH-200[4] | Acid treatment[9] | 2.5-3.5 | 200 | 110,000 | B |
| 1e APH-150[5] | Acid treatment[9] | 2.0-3.0 | 150 | 88,000 | B |
| 1f APH-100[6] | Acid treatment[9] | 1.5-2.5 | 100 | 64,000 | A |
| 1g GSN[7] | Acid treatment[9] | 3.0-4.0 | 250 | 123,000 | C |

[1]-[7] manufactured by Nitta Gelatin Inc.
[8] Extracted collagen was washed with water, immersed into lime, and washed with water again to be prepared as an alkali-treated gelatin.
[9] Extracted collagen was washed with water, immersed into an acid, and washed with water again to be prepared as an acid-treated gelatin.
[10] JIS K6503-2001
[11] JIS K6503-2001

Figure 1F:
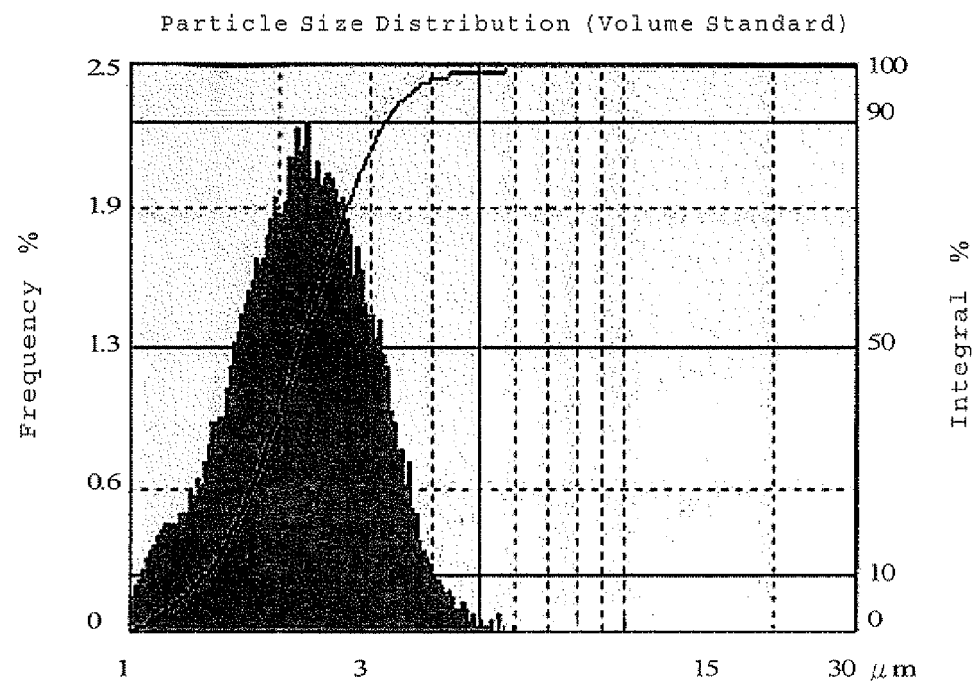
FIG. 1F is a particle size distribution map of the microcapsule-type latent curing agent obtained in Example 1f.

From Table 1, it can be seen that it is preferred for the gelatin to have been subjected to an acid treatment rather than an alkali treatment. It can also be seen that it is preferred for the jelly strength to be relatively low. Furthermore, for reference, the particle size distribution results for the microcapsule-type latent curing agent obtained in Example 1f measured using a particle size distribution measurement apparatus are shown in FIG. 1F. From FIG. 1F, it can be seen that the particle size distribution in terms of volume achieves a particle size distribution of 5 μm or less.

Example 2

2 parts by mass of the microcapsule-type latent curing agent obtained in Example 1f, 90 parts by mass of an alicyclic epoxy resin (CEL-2021P, Daicel Chemical Industries, Ltd.), and 12 parts by mass of a silane coupling agent (KBM5103, Shin-Etsu Chemical Co., ltd.) were uniformly mixed to obtain a thermosetting epoxy resin composition.

Comparative Example 1

A microcapsule-type latent curing agent coated with a non-enzyme-treated gelatin film was obtained by repeating Example 1f, except that the enzyme treatment was not carried out. Using this curing agent, a thermosetting epoxy resin composition was obtained in the same manner as in Example 2.

(Curability Evaluation 1)

The thermosetting epoxy resin compositions of Example 2 and Comparative Example 1 were subjected to thermal analysis using a differential thermal analyzer (DSC) (DSC 6200, Seiko Instruments Inc.). The obtained results are shown in Table 2 and FIG. 2, Here, concerning the curing properties of the microcapsule-type latent curing agent, "exothermic onset temperature" means the temperature at which curing starts, "exothermic peak temperature" means the temperature at which curing is most active, and "exothermic peak intensity" means rapid curability.

TABLE 2

| | Enzyme treatment | Exothermic onset temperature (° C.) | Exothermic peak temperature (° C.) | Exothermic peak intensity (mW) |
|---|---|---|---|---|
| Example 2 | treated | 86.8 | 113.8 | 48.03 |
| Comparative Example 1 | not treated | 100.6 | 119.1 | 28.83 |

Figure 2:
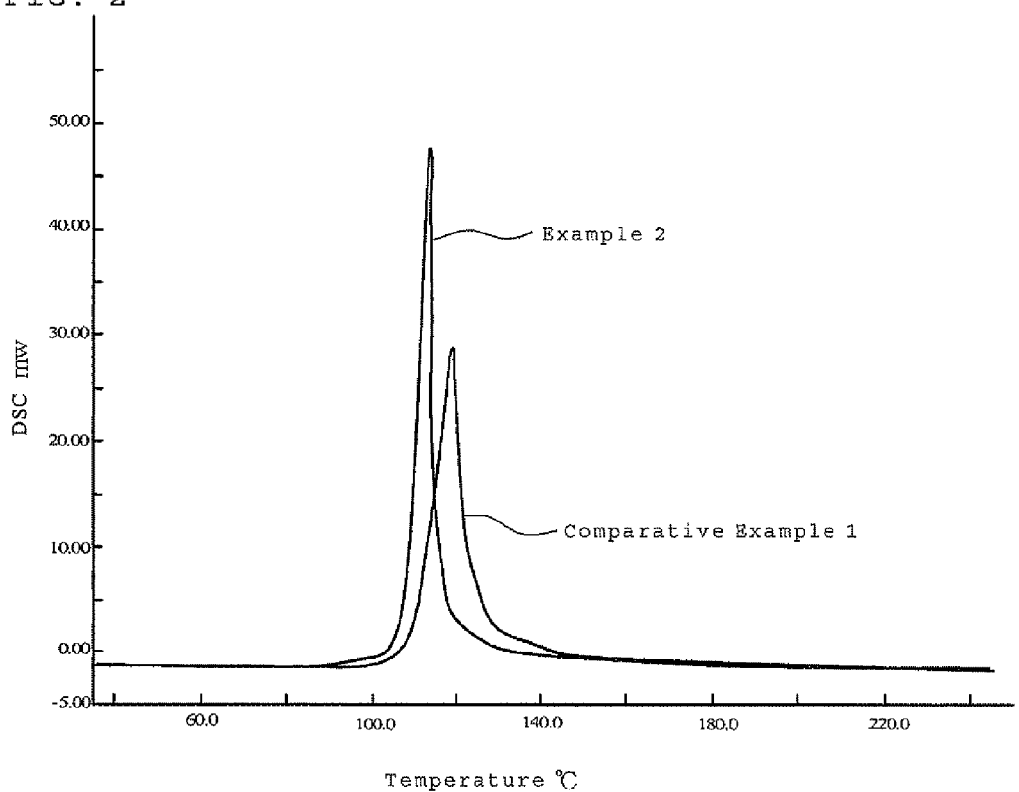
FIG. 2 is a DSC measurement diagram of the thermosetting epoxy resin compositions prepared in Example 2 and Comparative Example 1.

From Table 2 and FIG. 2, it can be seen that the thermosetting epoxy resin composition of Example 2, in which a microcapsule-type latent curing agent coated with an enzyme-treated gelatin film was used, had an exothermic onset temperature and an exothermic peak temperature which had shifted to the low-temperature side compared with the thermosetting epoxy resin composition of Comparative Example 1, in which a microcapsule-type latent curing agent coated with a non-enzyme-treated gelatin film was used. Furthermore, it can be seen that the exothermic peak intensity also was larger by about a factor of 1.7. Therefore, the microcapsule-type latent curing agent coated with an enzyme-treated gelatin film (Example 2) had improved latency and improved thermal response, since it had been subjected to an enzyme treatment. It can thus be seen that low-temperature rapid curability of a thermosetting epoxy resin composition can be realized.

Reference Example 1

Effects of a Cracking Treatment

The microcapsule-type latent curing agent obtained in Example 2 was cracked using a jet mill (A-O Jet Mill, Seishin Enterprise Co., Ltd.). Using the cracked curing agent, a thermosetting epoxy resin composition was obtained in the same manner as in Example 2.

(Curability Evaluation 2)

The thermosetting epoxy resin compositions of Example 2 and Reference Example 1 were subjected to thermal analysis in the same manner as for Example 2. The obtained results are shown in Table 3 and FIG. 3.

TABLE 3

|  | Cracking treatment | Exothermic onset temperature (° C.) | Exothermic peak temperature (° C.) | Exothermic peak intensity (mW) |
|---|---|---|---|---|
| Example 2 | not treated | 86.8 | 113.8 | 48.03 |
| Reference Example 1 | treated | 72.5 | 103.3 | 23.23 |

Figure 3:
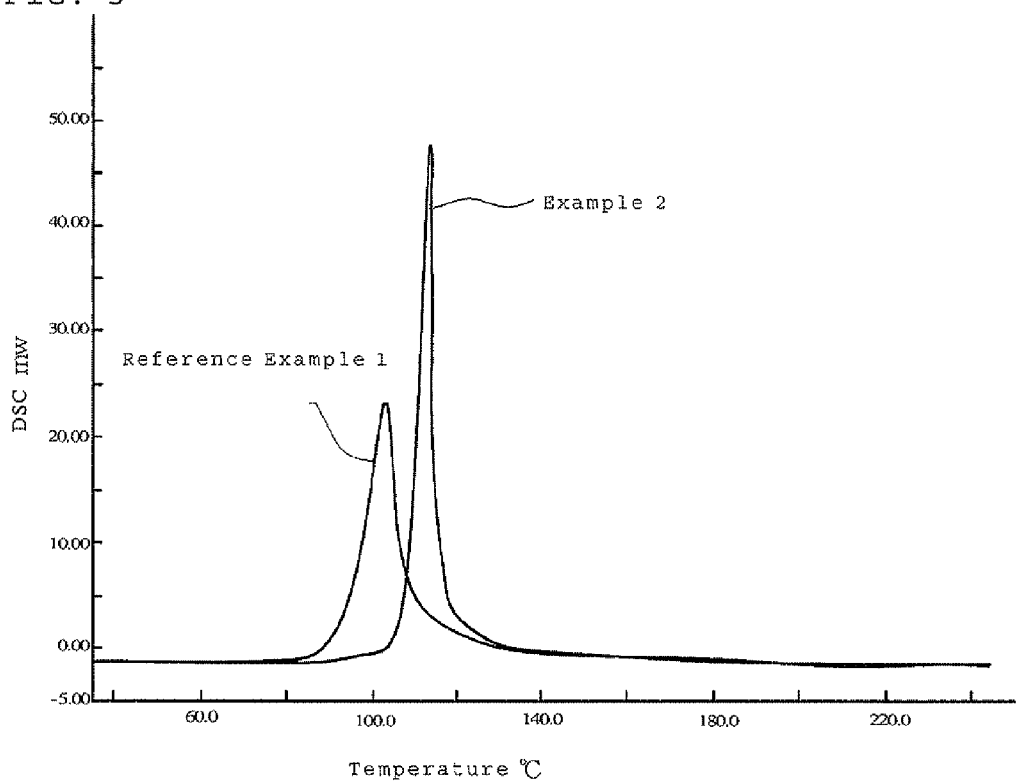
FIG. 3 is a DSC measurement diagram of the thermosetting epoxy resin compositions prepared in Example 2 and Reference Example 1.

From Table 3 and FIG. 3, it can be seen that if a cracking treatment is carried out, the exothermic onset temperature and exothermic peak temperature shift to the low-temperature side, and that the exothermic peak intensity becomes smaller.

Example 3

840 parts by mass of distilled water, 0.05 parts by mass of a surfactant (Newrex R-T, NOF Corporation), 7.9 parts by mass of gelatin (APH-100, Nitta Gelatin Inc.), and 0.1 parts by mass of polyvinyl alcohol (PVA 205, Kuraray Co., Ltd.) were charged into a three-liter interfacial polymerization vessel equipped with a thermometer, and the resultant solution was uniformly mixed. This mixed solution was further charged with an oil phase solution in which 36 parts by mass of a 24% isopropanol solution of aluminum monoacetylacetonate bis(ethylacetoacetate) (Alumichelate D, Kawaken Fine Chemicals Co., Ltd.) and 25 parts by mass of a methylenediphenyl-4,4'-diisocyanate (3 mol) in trimethylolpropane (1 mol) adduct (D-109, Mitsui Takeda Chemicals Inc.) were dissolved in 135 parts by mass of ethyl acetate. The resultant solution was emulsified and mixed by a homogenizer (10000 rpm for 10 min, homogenizer T-50, IKA). Then, the mixture was allowed to undergo interfacial polymerization for 3 hours at 60° C.

After the reaction was finished, the temperature of the polymerization reaction solution was adjusted to 40° C. The solution was then charged with 0.08 parts by mass of an enzyme (Protease N "Amano G", Amano Enzyme Inc.), and the resultant solution was stirred for 6 hours at 40° C. The resultant interfacial polymerization particles were filtered, washed, and then dried to obtain a spherical microcapsule-type latent curing agent coated with an enzyme-treated gelatin film.

2 parts by mass of the obtained microcapsule-type latent curing agent, 90 parts by mass of an alicyclic epoxy resin (CEL-2021P, Daicel Chemical Industries, Ltd.), and 12 parts by mass of a silane coupling agent (KBM5103, Shin-Etsu Chemical Co., ltd.) were uniformly mixed to obtain a thermosetting epoxy resin composition.

Example 4

A spherical microcapsule-type latent curing agent coated with an enzyme-treated gelatin film was obtained by repeating Example 3, except that 7.7 parts by mass of gelatin and 0.3 parts by mass of polyvinyl alcohol were used. Then, a thermosetting epoxy resin composition was obtained.

(Curability Evaluation 3)

The thermosetting epoxy resin compositions of Examples 3 and 4 were subjected to thermal analysis in the same manner as for Example 2. The obtained results are shown in Table 4 and FIG. 4.

TABLE 4

|  | Gelatin parts by mass | PVA parts by mass | Exothermic onset temperature (° C.) | Exothermic peak temperature (° C.) | Exothermic peak intensity (mW) |
|---|---|---|---|---|---|
| Example 3 | 7.9 | 0.1 | 80.4 | 105.0 | 50.41 |
| Example 4 | 7.7 | 0.3 | 70.3 | 97.9 | 30.64 |

Figure 4:
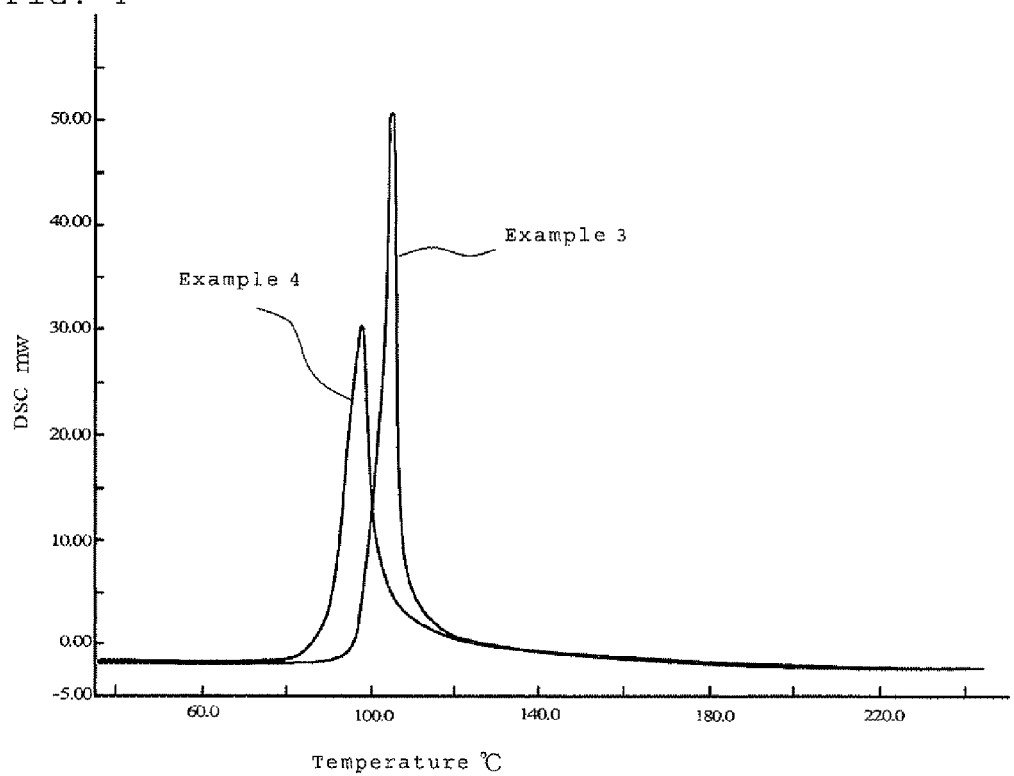
FIG. 4 is a DSC measurement diagram of the thermosetting epoxy resin compositions prepared in Examples 3 and 4.

From Table 4 and FIG. 4, it can be seen that if the used amount of polyvinyl alcohol is increased, although the exothermic onset temperature and the exothermic peak temperature shift to the low-temperature side, the exothermic peak temperature tends to markedly decrease. Therefore, the used amount of polyvinyl alcohol is preferably in a range not exceeding 0.3 parts by mass with respect to 7.7 parts by mass of gelatin.

Example 5

The microcapsule-type latent curing agent obtained in Example 3 was cracked using a jet mill (A-O Jet Mill, Seishin Enterprise Co., Ltd.). Using the cracked curing agent, a thermosetting epoxy resin composition was obtained in the same manner as in Example 3.

(Curability Evaluation 4)

The thermosetting epoxy resin compositions of Examples 3 and 5 were subjected to thermal analysis in the same manner as for Example 2. The obtained results are shown in Table 5 and FIG. 5.

TABLE 5

|  | Cracking treatment | Exothermic onset temperature (° C.) | Exothermic peak temperature (° C.) | Exothermic peak intensity (mW) |
|---|---|---|---|---|
| Example 3 | not treated | 80.4 | 105.0 | 50.41 |
| Example 5 | treated | 77.6 | 101.8 | 40.27 |

Figure 5:
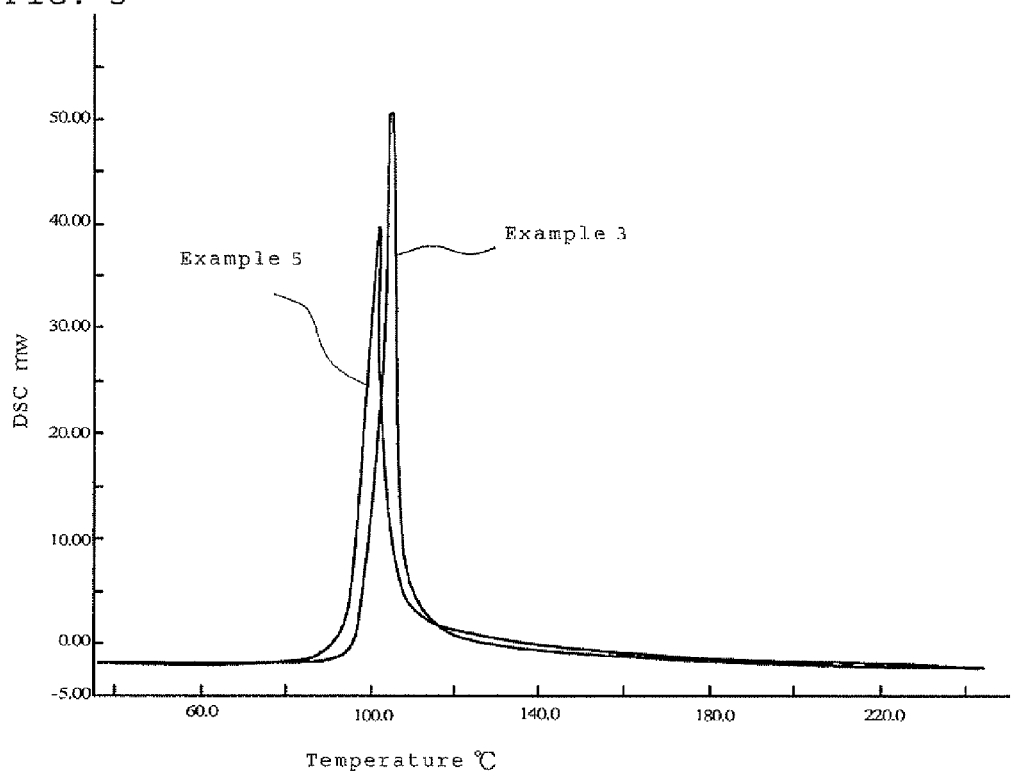
FIG. 5 is a DSC measurement diagram of the thermosetting epoxy resin compositions prepared in Examples 3 and 5.
Figure 6:
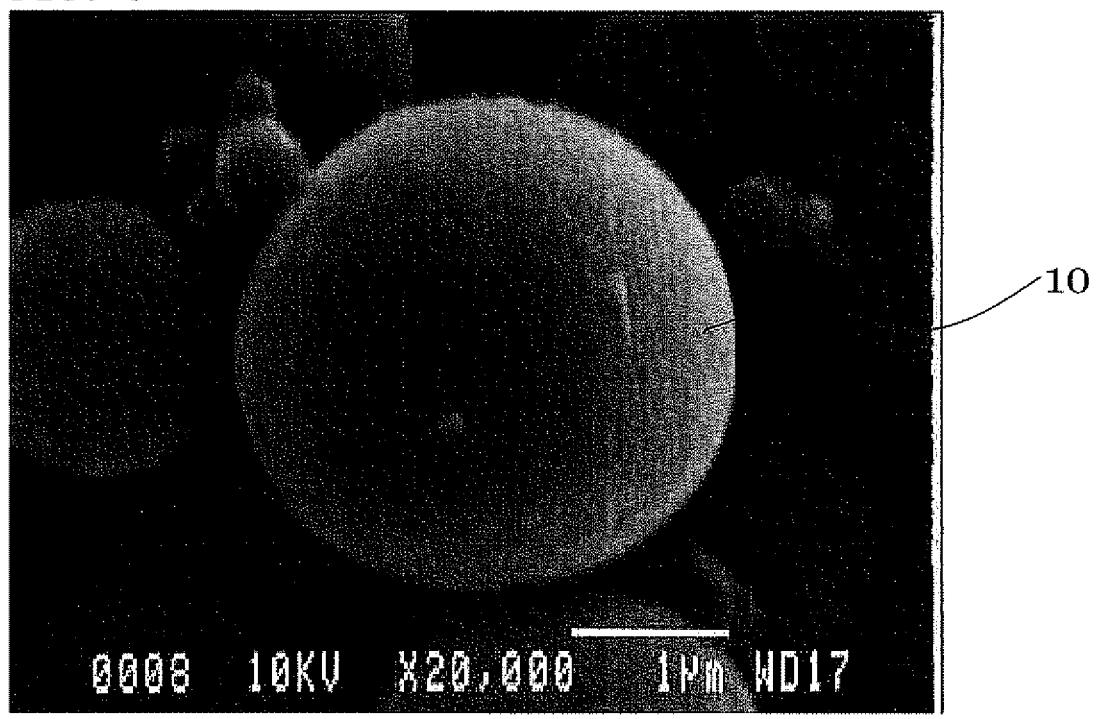
FIG. 6 is an electron micrograph of the microcapsule-type latent curing agent of Example 5 which was subjected to a cracking treatment.

From Table 5 and FIG. 5, it can be seen that if polyvinyl alcohol is also used, even if a cracking treatment is carried out, there is no change in the exothermic onset temperature or exothermic peak temperature, and that the decrease in the exothermic peak intensity is also suppressed. FIG. 6 shows an electron micrograph of the microcapsule-type latent curing agent 10 of Example 5 which was subjected to a cracking treatment. Compared with the microcapsule-type latent curing agent of FIG. 1C, in which polyvinyl alcohol was not used, when polyvinyl alcohol is used it can be seen that the level of surface unevenness is reduced.

INDUSTRIAL APPLICABILITY

The microcapsule-type latent curing agent of the present invention is an aluminum chelate-based latent curing agent having excellent latency and thermal response which is coated with an enzyme-treated gelatin film. Therefore, a thermosetting resin composition containing this microcapsule-type latent curing agent exhibits good low-temperature rapid curability. Accordingly, such a thermosetting resin composition is useful in cases of having to join an electronic part, such as an IC chip, to a wiring substrate without applying an overly-large heat shock.

The invention claimed is:

1. A microcapsule-type latent curing agent comprising:
    a latent curing agent in which an aluminum chelating agent is retained in a porous resin obtained by interfacial polymerization of a polyfunctional isocyanate compound; and
    an enzyme-treated gelatin film coating the latent curing agent;
    wherein:
    the enzyme-treated gelatin film has a thickness of from 1 to 1000 nm;
    the enzyme-treated gelatin film is formed of a gelatin obtained by subjecting a gelatin which exhibits a jelly strength according to JIS K6503-2001 of 10 to 200 to an enzyme treatment; and
    the enzyme-treated gelatin film has surface irregularities that were formed by the enzyme treatment.

2. The microcapsule-type latent curing agent according to claim 1, wherein the aluminum chelating agent is a complex compound in which a β-ketoenolate anion to serve as a ligand is coordinated to aluminum.

3. The microcapsule-type latent curing agent according to claim 1, wherein the aluminum chelating agent is aluminum monoacetylacetonate bis(ethylacetoacetate).

4. The microcapsule-type latent curing agent according to claim 1, wherein the enzyme-treated gelatin film contains a polyvinyl alcohol.

5. The microcapsule-type latent curing agent according to claim 1, wherein the gelatin has a weight average molecular weight of 1000 to 110000.

6. A method for producing the microcapsule-type latent curing agent as set forth in claim 1, the method comprising:
    dissolving the aluminum chelating agent and the polyfunctional isocyanate compound in a volatile organic solvent;
    charging the obtained solution into a gelatin-containing aqueous phase;
    carrying out interfacial polymerization by heating and stirring; and
    subjecting the gelatin to the enzyme treatment to form the enzyme-treated gelatin film having surface irregularities by adding an enzyme to the obtained polymerization reaction mixture.

7. The method according to claim 6, wherein the aqueous phase contains polyvinyl alcohol.

8. The method according to claim 6, wherein the volatile organic solvent is lower alkyl acetate.

9. A thermosetting resin composition comprising the microcapsule-type latent curing agent as set forth in claim 1, a silane coupling agent, and a thermosetting resin.

10. The thermosetting resin composition according to claim 9, wherein the thermosetting resin is a thermosetting epoxy resin.

* * * * *